United States Patent [19]
Sziebert

[11] Patent Number: 6,064,174
[45] Date of Patent: *May 16, 2000

[54] MOTOR CONTROL CIRCUIT AND METHOD WITH DIGITAL LEVEL SHIFTING

[75] Inventor: Imre L. Sziebert, San Jose, Calif.

[73] Assignee: STMicroelectronics, Inc., Carrollton, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/978,547

[22] Filed: Nov. 26, 1997

[51] Int. Cl.[7] .................................................. H02P 5/34
[52] U.S. Cl. ........................ 318/801; 318/254; 318/138; 364/457; 327/109
[58] Field of Search ................................... 318/801, 254, 318/439, 138; 364/457; 327/109; 363/13

[56] References Cited

U.S. PATENT DOCUMENTS

| | | | |
|---|---|---|---|
| 4,384,665 | 5/1983 | Waddington | 327/109 X |
| 4,777,602 | 10/1988 | Wesner | 364/457 |
| 5,297,024 | 3/1994 | Carobolante | 360/67 |
| 5,376,834 | 12/1994 | Carobolante | 327/143 |
| 5,572,156 | 11/1996 | Diazzi | 327/109 |

*Primary Examiner*—Karen Masih
*Attorney, Agent, or Firm*—Theodore E. Galanthay; Lisa K. Jorgenson; Andrew Szuwalski

[57] ABSTRACT

A motor control circuit control the operation of a motor that includes a motor coil. The motor control circuit includes an analog driver structured to supply the motor coil with a supply voltage in response to receiving an analog driver input signal. Coupled to the analog driver is a digital-to-analog converter that is structured to convert a digital motor control signal to the analog driver input signal. Coupled to the digital-to-analog converter is a lever shifter that is structured to receive a low voltage digital command signal from a digital motor controller. The level shifter is also structured to increase the voltage of the digital command signal to produce the digital motor control signal and provide the digital motor control signal to the digital-to-analog converter.

19 Claims, 7 Drawing Sheets

MOTOR CONTROL CIRCUIT AND METHOD WITH DIGITAL LEVEL SHIFTING

TECHNICAL FIELD

The present invention relates to inductive motors, and more particularly, to motor control circuits with digital level shifting.

BACKGROUND OF THE INVENTION

Figure 1:
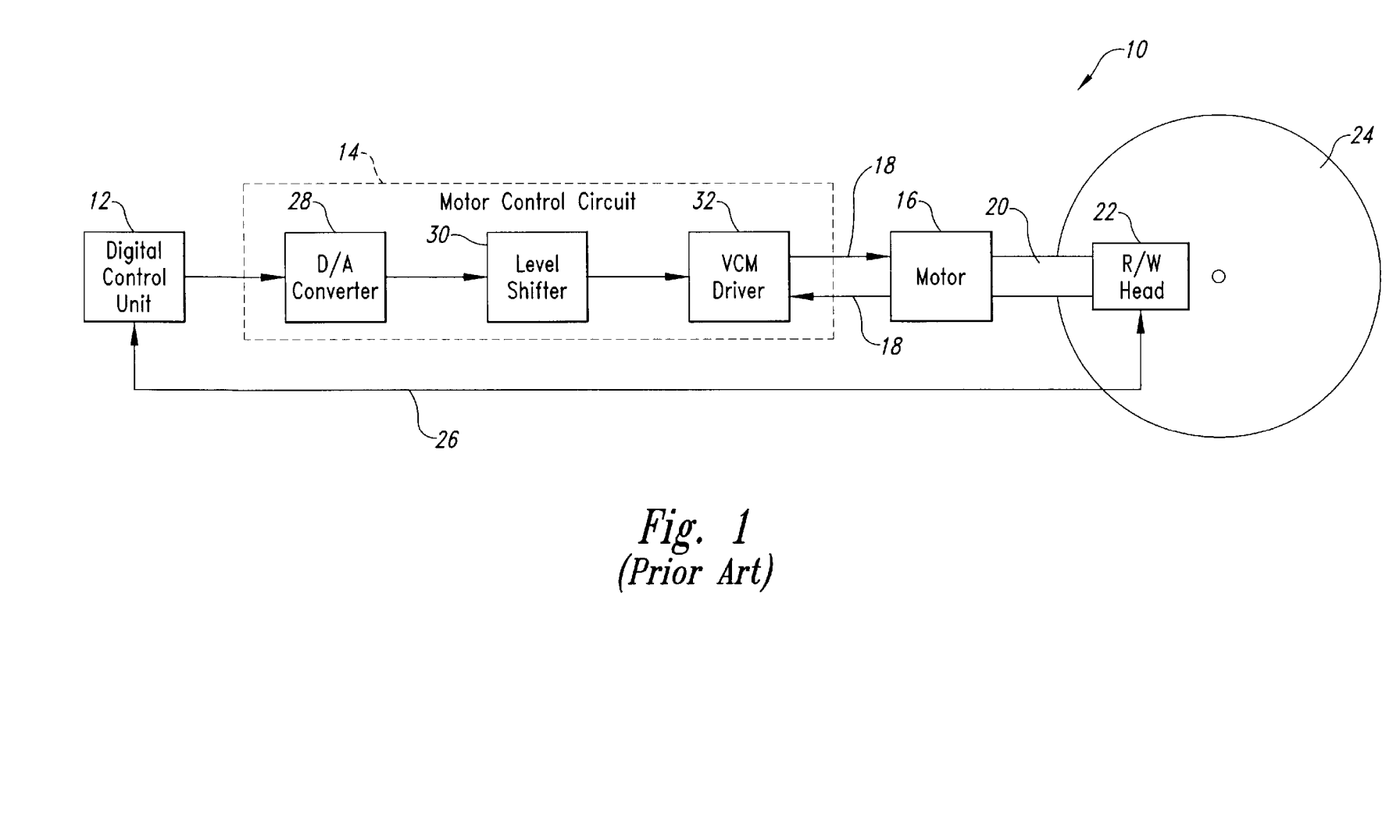
FIG. 1 is a schematic representation of a prior art computer disk drive system.

Computer disk drive systems, such as hard disk drives, CD-ROM drives, and floppy disk drives, are widely used to store information for use by computers that include the disk drive systems. A typical disk drive system 10 is schematically shown in FIG. 1. The disk drive system 10 includes a digital control unit 12, such as a central processing unit (CPU), and a motor control circuit 14 that together control a motor 16, typically referred to as a voice coil motor.

The voice coil motor 16 typically includes a single coil situated inside a tubular permanent magnet and is connected to the motor control circuit 14 by a plurality of flex cables 18. The coil is free to move inside the magnet subject to a minimal amount of damping and friction from the flex cables 18. An actuator arm 20 is connected between the coil and a read/write head 22 that is positioned on a rotatable storage disk 24. The actuator arm 20 and read/write head 22 move backwards and forwards in a linear path along with the coil.

The coil, actuator arm 20, and read/write head 22 are moved in a forward direction by driving current through the coil in a forward direction and are moved in a backward direction by driving current through the coil in a backward direction. The speed at which the coil, actuator arm 20, and read/write head 22 are moved depends on the amount of current driven through the coil. The coil, actuator arm 20, and read/write head 22 will maintain momentum in the forward direction until a current is driven through the coil in a backward direction resulting in a negative acceleration. The coil, actuator arm 20, and read/write head 22 will slow and stop according to the amount of current driven through the coil in the backward direction, and a further application of current will accelerate the coil in the backward direction.

The storage disk 24 typically has a magnetic surface, or an optically readable surface for CD-ROM drives, with a plurality of concentric tracks in which digital data is stored. The read/write head 22 is positioned by the motor 16 over a track to read data in the track or to write data to the track. The data written to and read from the storage disk 24 are conveyed between the CPU 12 and the read/write head 22 by a data bus 26.

The position of the read/write head 22 is determined by a control logic unit in the disk drive system from two sources of information. The read/write head 22 itself reads position data from the rotating storage disk as it travels over the storage disk to the selected track and transmits this data to the CPU 12 over the data bus 26. In addition, the CPU 12 retains in a memory preassigned velocity profiles to achieve a desired track position. The CPU 12 senses the track position and the amount of current in the coil to determine the acceleration of the coil, and then compares this information with the velocity profiles stored in the memory to optimize the position of the read/write head 22.

The motor 16 needs a relatively high voltage supply (e.g., 12 V) to drive the coil, actuator arm 20, and read/write head 24 back and forth to position the read/write head over the desired tracks. However, the digital drive commands issued by the CPU 12 to position the read/write head 24 are of a relatively low voltage level (e.g., 5 V or less). That is, the digital drive command typically are expressed in binary bits of logic level 1 or 0, with a I logic level corresponding to 5 V and a 0 logic level corresponding to 0 V.

To convert the low voltage digital command signals from the CPU 12 to the high voltage analog driving signals needed to drive the motor 16, the motor control circuit includes a digital to analog converter (DAC) 28 and a level shifter 30. As its name implies, the DAC 28 converts the digital command signals to low voltage analog command signals. The level shifter 30 converts the low voltage analog command signals to the high voltage analog driving signals needed to drive the motor 16. The level shifter 30 supplies the high voltage analog driving signals to a voice coil motor (VCM) driver 32 which drives current through the motor coil to move the read/write head 22 appropriately. Often the level shifter 30 is part of the VCM driver 32 and the VCM driver 32 may include more than one level shifter.

A problem with prior art disk drive systems, such as the disk drive system 10, is that the level shifter 30 (or plural level shifters) degrades system performance in various ways. For example, each level shifter 30 causes unwanted signal offset, that is, the output of each level shifter is finite even with zero input. Moreover, each level shifter 30 reduces the power supply rejection ratio of the motor control circuit 14, that is, the error added to the analog command signals because of power supply fluctuations. Such errors introduced by each level shifter 30 degrade the fine control of the analog command signals provided by the DAC 28.

SUMMARY OF THE INVENTION

An embodiment of the present invention is directed to a motor control circuit for controlling the operation of a motor that includes a motor coil. The motor control circuit includes an analog driver structured to supply the motor coil with a supply voltage in response to receiving an analog driver input signal. Coupled to the analog driver is a digital-to-analog converter that is structured to convert a digital motor control signal to the analog driver input signal. Coupled to the digital-to-analog converter is a level shifter that is structured to receive a low voltage digital command signal from a digital motor controller. The level shifter is also structured to increase the voltage of the digital command signal to produce the digital motor control signal and provide the digital motor control signal to the digital-to-analog converter.

In one embodiment of the invention, a motor control circuit includes an analog driver and a digital-to-analog converter coupled to the analog driver. The analog driver is structured to connect a first end of a motor coil to a supply voltage in response to receiving an analog driver input signal that is greater than approximately one-half of the supply voltage. The analog driver also is structured to connect a second end of the motor coil to the supply voltage in response to receiving an analog driver input signal that is less than approximately one-half of the supply voltage. The digital-to-analog converter is structured to convert a digital motor control signal to the analog driver input signal. The digital-to-analog converter includes a biasing circuit that establishes a midpoint of the digital-to-analog converter to be approximately one-half of the supply voltage.

DESCRIPTION OF THE INVENTION

Figure 2:
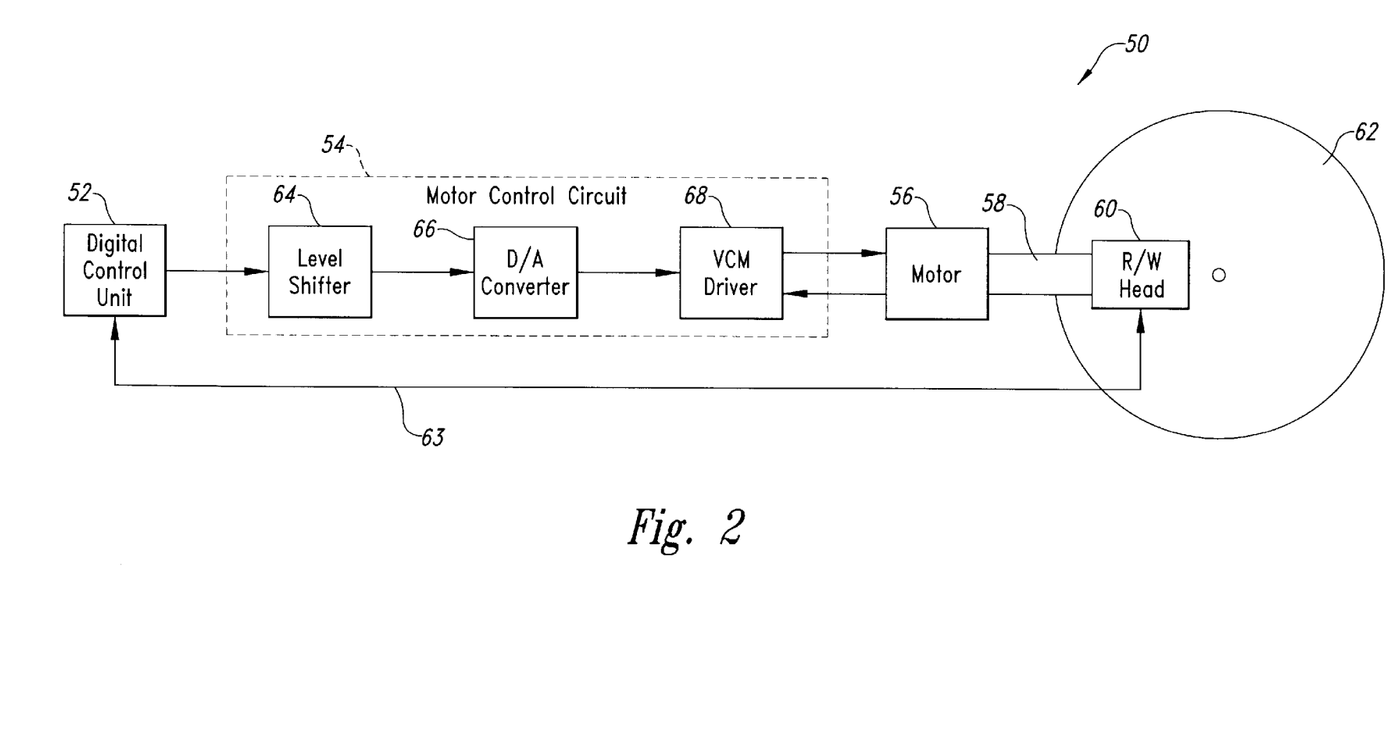
FIG. 2 is a schematic representation of a computer disk drive system according to the present invention.

A computer disk drive system 50 according to an embodiment of the present invention is shown in FIG. 2. The disk drive system 50 includes a digital control unit 52 coupled by a motor control circuit 54 to a voice coil motor 56. As is typical, the motor 56 is coupled by an actuator arm 58 to a read/write head 60 positioned above a rotatable storage disk 62. The read/write head 60 is also coupled to the digital control unit 52 by a data bus 63. In contrast to prior art motor control circuits, such as that shown in FIG. 1, the motor control circuit 54 includes a digital level shifter 64 coupled between the digital control unit 52 and a digital-to-analog converter (DAC) 66. The motor control circuit 54 also includes a voice coil motor (VCM) driver 68 coupled between the DAC 66 and the motor 56. As discussed in more detail below, the level shifter 64 increases the voltage level of digital command signals received from the digital control unit 52 to produce digital motor control signals that are supplied to the DAC 66. It should be appreciated that, although FIG. 2 shows a voice coil motor of a computer disk drive system, the present invention is applicable to control any motor that is driven based on digital command signals.

The digital control unit 52 is the portion of the computer that determines which track of the storage disk 62 is desired and where on the storage disk the desired track is located. The digital control unit 52 transmits to the motor control circuit 54 digital command signal that instruct the motor control circuit 54 to move the read/write head 60 to a selected position over the desired track on the storage disk 62. The digital control unit 52 can be implemented using the central processing unit (CPU) of the computer or a separate processor devoted to controlling the disk drive system 50. It should be appreciated that the operations of the digital control unit 52, motor 56, read/write head 60, and storage disk 62 are as discussed above unless specifically noted.

Figure 3:
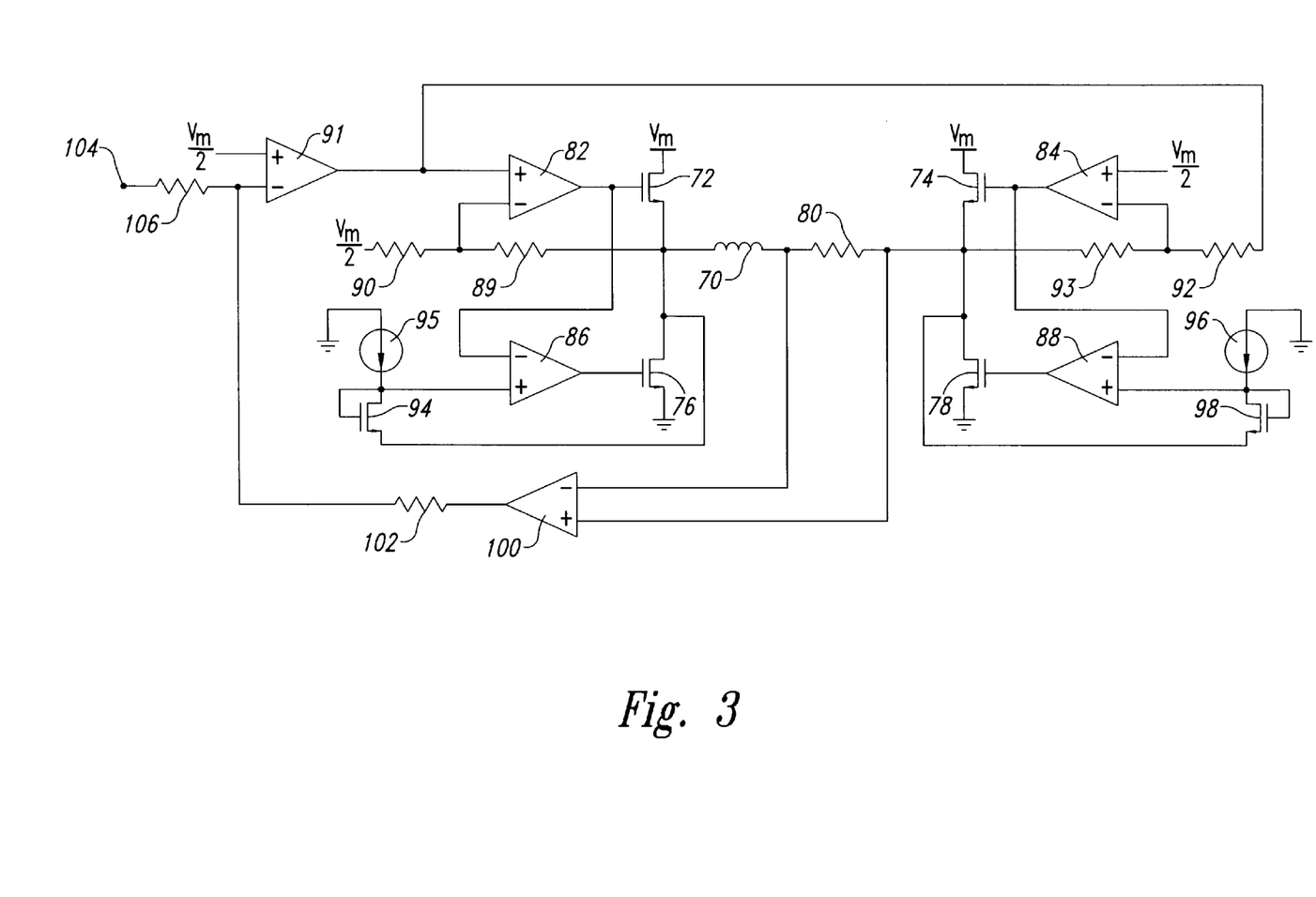
FIG. 3 is a circuit diagram of a motor driver circuit of the computer disk drive system shown in FIG. 2.

A circuit diagram of the VCM driver 68 coupled to an inductive coil 70 of the motor 56 is shown in FIG. 3. The coil 70 is driven by an H-bridge circuit that includes first and second high-side transistors 72, 74 and first and second low-side transistors 76, 78. The transistors 72–78 are shown as N-channel DMOS driving transistors although various other types of transistors could be employed. A drain terminal of each of the high-side transistors 72, 74 is connected to a motor supply voltage $V_m$ (e.g., 12 V) and a source terminal of each of the low-side transistors 76, 78 is connected to ground. The source terminal of the first high-side transistor 72 and the drain terminal of the first low-side transistor 76 are coupled to a first end of the motor coil 70. Likewise, the source terminal of the second high-side transistor 74 and the drain terminal of the second low-side transistor 78 are coupled through a sense resistor 80 to a second end of the motor coil 70.

As is conventional, each of the transistors 72–78 is switched on by raising a gate voltage applied to its gate to a level exceeding a source voltage at its source by at least a threshold voltage. The transistors 72–78 are selectively switched on and off to direct current through the motor coil 70 in either a forward direction (left to right in FIG. 3) or a backward direction (right to left). For example, when the transistors 72, 78 are switched on, current flows in a forward direction from the voltage source $V_m$ through the first high-side transistor 72, motor coil 70, sense resistor 80, and second low-side transistor 78 to ground. Similarly, when the transistors 74, 76 are switched on, current flows in a backward direction from the voltage source $V_m$ through the second high-side transistor 74, sense resistor 80, motor coil 70, and first low-side transistor 76 to ground.

The first and second high-side transistors 72, 74 are driven by first and second differential amplifiers 82, 84 coupled to the gate terminals of the first and second high-side transistors, respectively. Similarly, gate terminals of the first and second low-side transistors 76, 78 are coupled to and driven by first and second low-side differential amplifiers 86, 88, respectively. The inverting input of the first high-side amplifier 82 is coupled by a feedback resistor 89 to the source terminal of the first high-side transistor 72 and by a bias resistor 90 to a supply voltage $V_m/2$. The non-inverting input of the first high-side differential amplifier 82 is coupled to the output of a summing amplifier 91 and to the inverting input of the second high-side differential amplifier 84 by a resistor 92. The inverting input of the second high-side differential amplifier 84 also is coupled by a feedback resistor 93 to the source terminal of the second high-side transistor 74. The non-inverting input of the second high-side differential amplifier is connected to the supply voltage $V_m/2$.

The first and second low-side amplifiers 86, 88 are connected to their respective low-side transistors 76, 88 such that the first low-side transistor is switched off when the first high-side transistor 72 is switched on and the second low-side transistor 78 is switched off when the second high-side transistor 74 is switched on. In particular, the inverting input of the first low-side amplifier 86 is coupled to the output of the first high-side amplifier 82 and the inverting input of the second low-side amplifier 88 is coupled to the output of the second high-side amplifier 84. In addition, the non-inverting input of the first low-side amplifier 86 is coupled to the source terminal of the first low-side transistor 76 by a diode-connected transistor 94. A reference current source 95 also is connected between the non-inverting input of the first low-side amplifier 86 and ground. Similarly, the non-inverting input of the second low-side amplifier 88 is coupled by a second current source 96 to ground and by a second diode connected transistor 98 to the source terminal of the second low-side transistor 78.

During operation, when the output of the summing amplifier 91 is greater than the voltage at the first end of the motor coil 70 by an amount equal to the threshold voltage of the first high-side transistor 72, then the first high-side amplifier 82 switches on the first high-side transistor 72 by creating a sufficient gate voltage on the gate terminal of the first high-side transistor. When the gate voltage of the first high-side transistor 72 is sufficiently high to switch on the first high-side transistor, then the first low-side amplifier 86 switches off the first low-side transistor 76. When the output of the summing amplifier 91 is sufficient to cause the first high-side transistor 72 to switch on, the second high-side amplifier 84 switches off the second high-side transistor 74 by creating a gate voltage on the gate terminal of the second high-side transistor that is less than a threshold voltage above the voltage at the source terminal of the second high-side transistor. Such a gate voltage on the second high-side transistor causes the second low-side amplifier 88 to switch on the second low-side transistor 78. Accordingly, a conductive path is created from the source voltage $V_m$ to ground via the first high-side transistor 72, motor coil 70, sense amplifier 80, and second low-side transistor 78, which drives current through the motor coil in the forward direction.

Similarly, when the output of the summing amplifier 91 is less than the voltage at the source terminal of the second high-side transistor 74, then the second high-side differential amplifier 84 switches on the second high-side transistor 74 by creating a sufficient gate voltage on the gate terminal of the second high-side transistor. When the gate voltage of the second high-side transistor 74 is sufficiently high to switch on the second high-side transistor, then the second low-side amplifier 88 switches off the second low-side transistor 78. When the output of the summing amplifier causes the second high-side transistor 74 to switch on, the first high-side amplifier 82 switches off the first high-side transistor 72 by creating a gate voltage on the first high-side transistor that is less than the threshold voltage above the voltage at the source terminal of the first high transistor. Such a gate voltage on the first high-side transistor cause the first low-side amplifier 86 to switch on the first low-side transistor 76. According, a conductive path is created from the source voltage $V_m$ to ground via the second high-side transistor 74, sense resistor 80, motor coil 70, and first low-side transistor 76, which drives current through the motor coil in the backward direction.

The sense resistor 80 is employed to sense the amount of current that is being driven through the motor coil 70. The voltage drop across the sense resistor 80 indicates the amount of current in the motor coil 70 and the voltage drop is amplified by a differential sense amplifier 100. An inverting input of the sense amplifier 100 is connected to a first end of the sense resistor 80 (the second end of the motor coil 70) while a non-inverting input of the sense amplifier 100 is connected to a second end of the sense resistor (the source terminal of the second high-side transistor 74). An output of the sense amplifier 100 is connected through a resistor 102 to an inverting terminal of the summing amplifier 91. The inverting input of the summing amplifier 91 is also coupled to an input terminal 104 through an input resistor 106. The input terminal is coupled to receive the analog motor control signals from the DAC 66. The summing amplifier 91 also has a non-inverting input connected to a voltage ($V_m/2$) equal to onehalf of the supply voltage $V_m$. As such, the summing amplifier 91 sums the voltage of the analog motor control signal received from the DAC at the input terminal 104 with the voltage fed back from the sense resistor 80 by the sense amplifier 100.

It is desirable to ensure that the average voltage at either side of the motor coil 70 is equal to approximately one-half of the supply voltage $V_m(V_m/2)$ Keeping the average voltage at approximately one-half of the supply voltage $V_m$ allows the maximum linear AC voltage to be developed across the motor coil 70 before saturation effects develop. Such saturation effects tend to degrade linearity of the motor coil 70 which reduces the ability to precisely position the read/write head 60 on a desired track of the storage disk 62. As discussed below, the DAC 66 can be designed to ensure that the average voltage at either side of the motor coil 10 is approximately equal to $V_m/2$ without requiring any level shifters in the VCM driver 68.

Figure 4:
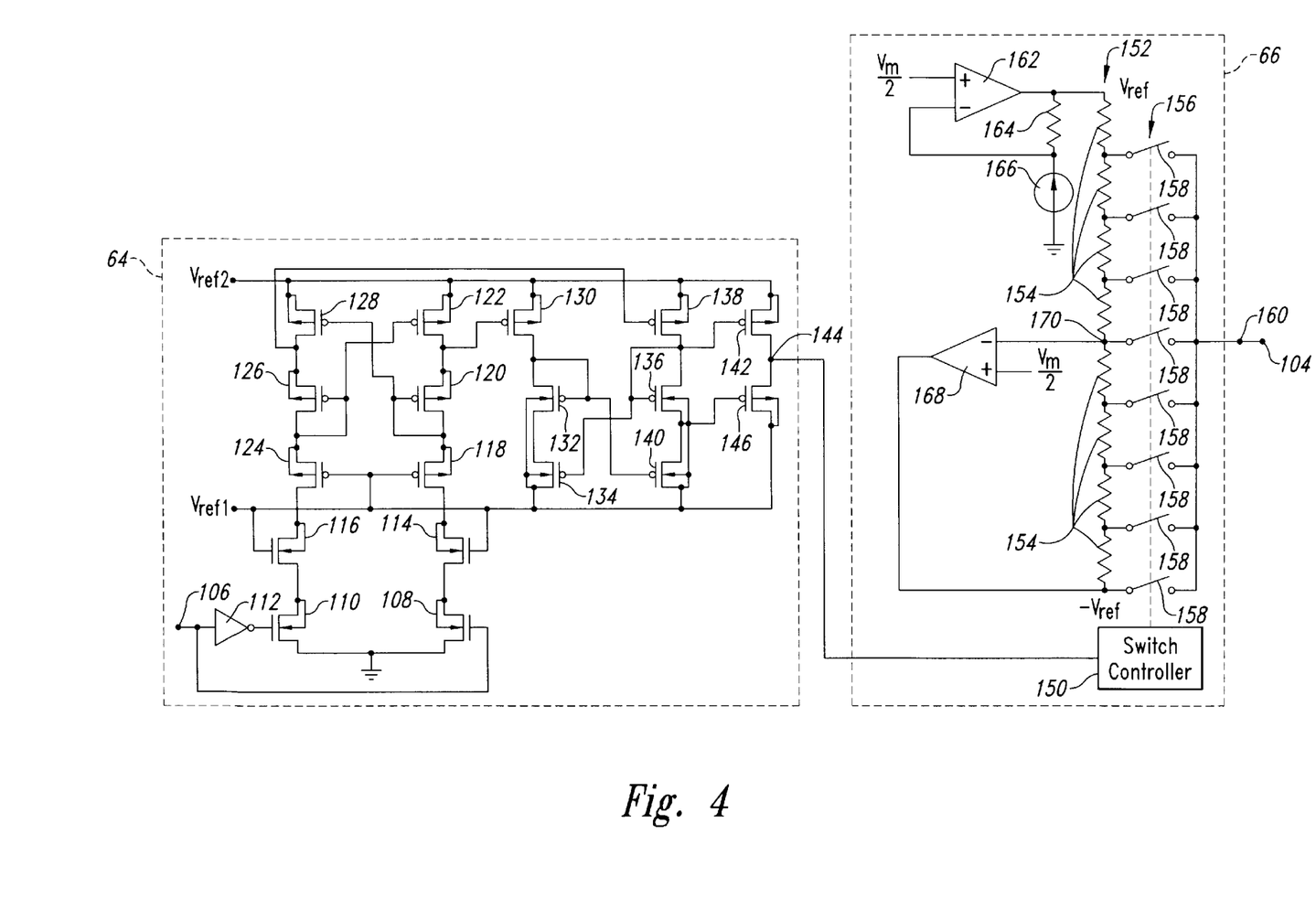
FIG. 4 is a circuit diagram of a level shifter and digital-to-analog converter of the computer disk drive system shown in FIG. 2.

A circuit diagram of the level shifter 64 and the DAC 66 is shown in FIG. 4. The level shifter 64 includes an input terminal 106 that receives from the digital control unit 52 digital command signals representing the voltage levels needed to be applied to the motor 56 to move the read/write head 60 to a desired position above a selected track on the storage disk 62. The level shifter 64 includes a first N-channel MOS transistor 108 having a source terminal coupled to ground, a gate terminal coupled to the input terminal 106 and a drain terminal. The level shifter 64 also includes a second N-channel MOS transistor 110 having a source terminal coupled to ground, a gate terminal coupled by an inverter 112 to the input terminal 106, and a drain terminal. A third N-channel MOS transistor 114 has a source terminal coupled to the drain terminal of the first N-channel transistor 108, a gate terminal coupled to a first voltage reference ($V_{ref1}$), and a drain terminal. A fourth N-channel MOS transistor 116 has a source terminal coupled to the drain terminal of the second N-channel transistor 110, a gate terminal coupled to the first voltage reference, and a drain terminal.

A first P-channel MOS transistor 118 has a drain terminal coupled to the drain terminal of the third N-channel transistor 114, a gate terminal coupled to the first voltage reference $V_{ref1}$, and a source terminal coupled to drain and gate terminals of a second P-channel MOS transistor 120. A third P-channel MOS transistor 122 has a source terminal coupled to a second voltage reference $V_{ref2}$, a drain terminal coupled to a source terminal of the second P-channel transistor 118, and a gate terminal. A fourth P-channel MOS transistor 124 has a drain terminal coupled to the drain terminal of the fourth N-channel transistor 116, a gate terminal coupled to the first voltage reference $V_{ref1}$, and a source terminal coupled to drain and gate terminals of a fifth P-channel MOS transistor 126 and to the gate terminal of the third P-channel transistor 122. A sixth P-channel MOS transistor 128 has a source terminal coupled to the second voltage reference, a drain terminal coupled to a source terminal of the fifth P-channel transistor 126, and a gate terminal coupled to the gate and source terminals of the second P-channel transistor 120.

A seventh P-channel MOS transistor 130 has a gate terminal coupled to the drain terminal of the third P-channel transistor 122, a source terminal coupled to the second voltage reference $V_{ref2}$, and a drain terminal coupled to drain and gate terminals of a fifth N-channel MOS transistor 132. A sixth N-channel MOS transistor 134 has a drain terminal coupled to a source terminal of the fifth N-channel transistor 132, a source terminal coupled to the first voltage reference $V_{ref1}$, and a gate terminal coupled to gate and drain terminals of a seventh N-channel MOS transistor 136. An eighth P-channel MOS transistor 138 has a gate terminal coupled to the drain terminal of the sixth P-channel transistor 128, a source terminal coupled to the second voltage reference $V_{ref2}$, and a drain terminal coupled to the gate and drain of the seventh N-channel transistor 136. An eighth N-channel MOS transistor 140 has a gate terminal coupled to the gate and drain terminals of the fifth N-channel transistor, a drain terminal coupled to a source terminal of the seventh N-channel transistor 136, and a source terminal coupled to the first voltage reference $V_{ref1}$. A ninth P-channel MOS transistor 142 has a gate terminal coupled to the drain terminal of the eighth P-channel transistor 138, a source terminal coupled to the second voltage reference $V_{ref2}$, and a drain terminal coupled to an output terminal 144. A ninth N-channel MOS transistor 146 has a gate terminal coupled to the drain terminal of the eighth N-channel transistor 140, a drain terminal coupled to the output terminal 144, and a source terminal coupled to the first voltage reference $V_{ref1}$.

The level shifter 64 receives from the digital control unit 52 voltage values representing a logic 1 or a logic 0 and shifts those voltage values to higher levels (i.e., $V_{ref2}$ and $V_{ref1}$). For example, if a signal of 5 volts represents logic 1 and 0 volts represents logic 0, then the level shifter 64 may shift the logic 1 to be represented by 10 volts $V_{ref2}$ and the logic 0 to be represented by 5 volts ($V_{ref2}$). Of course, voltages other than 10 and 5 volts may be chosen for $V_{ref2}$ and $V_{ref1}$ without departing from the invention.

Figure 5A:
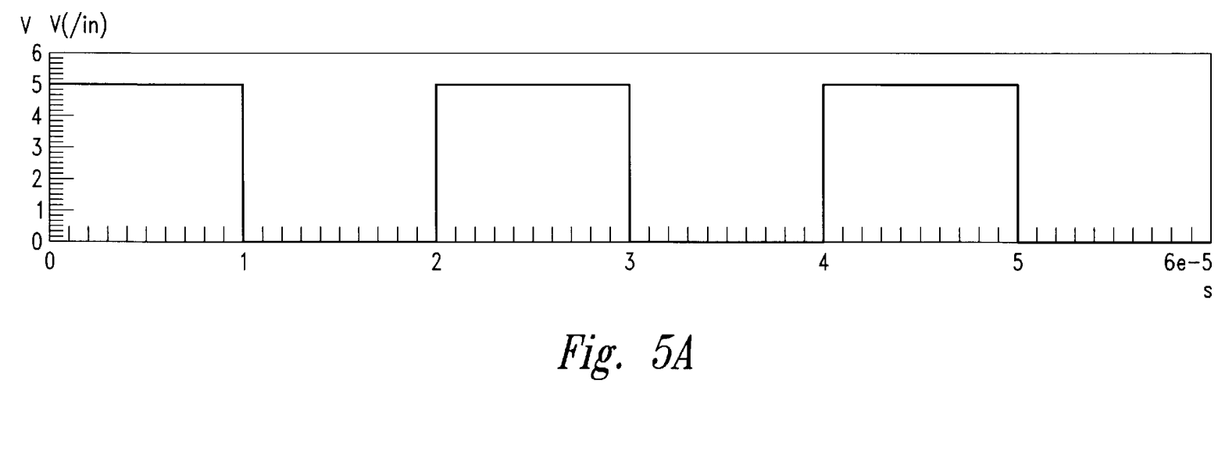
FIGS. 5A–5E is a set of graphs of voltages in level shifter during an actual simulation.
Figure 5B:
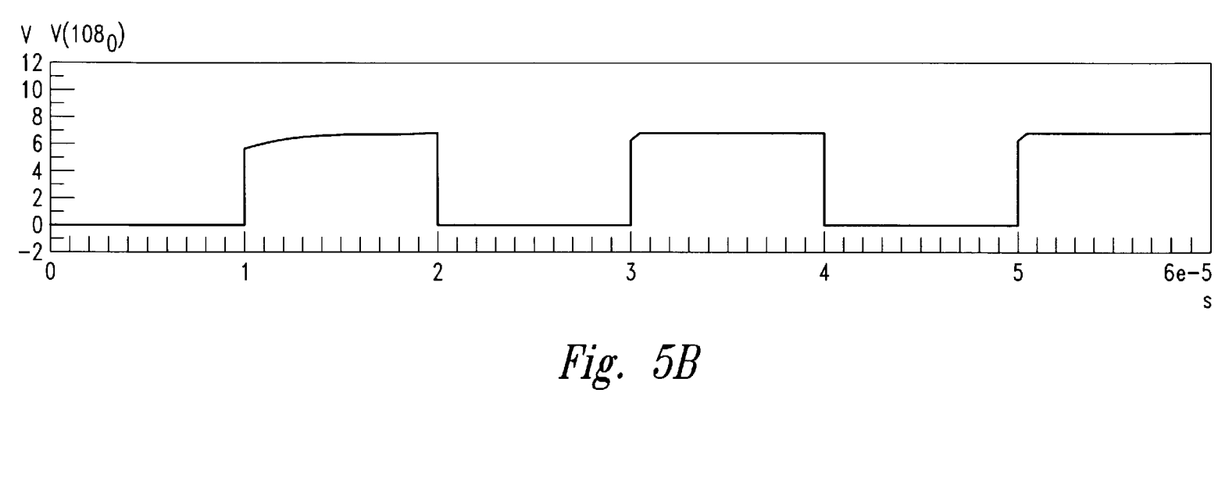
Figure 5C:
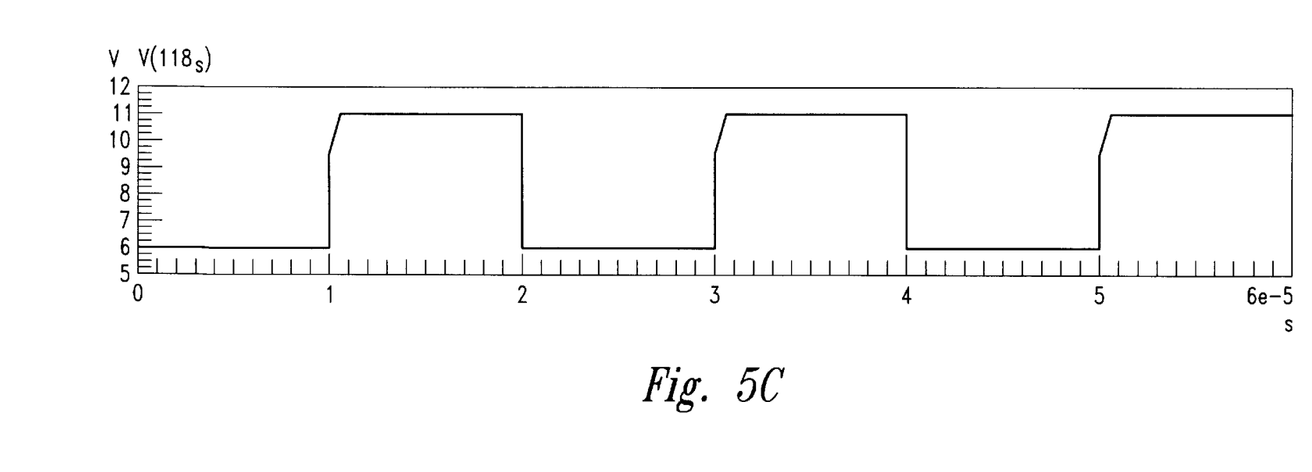
Figure 5D:
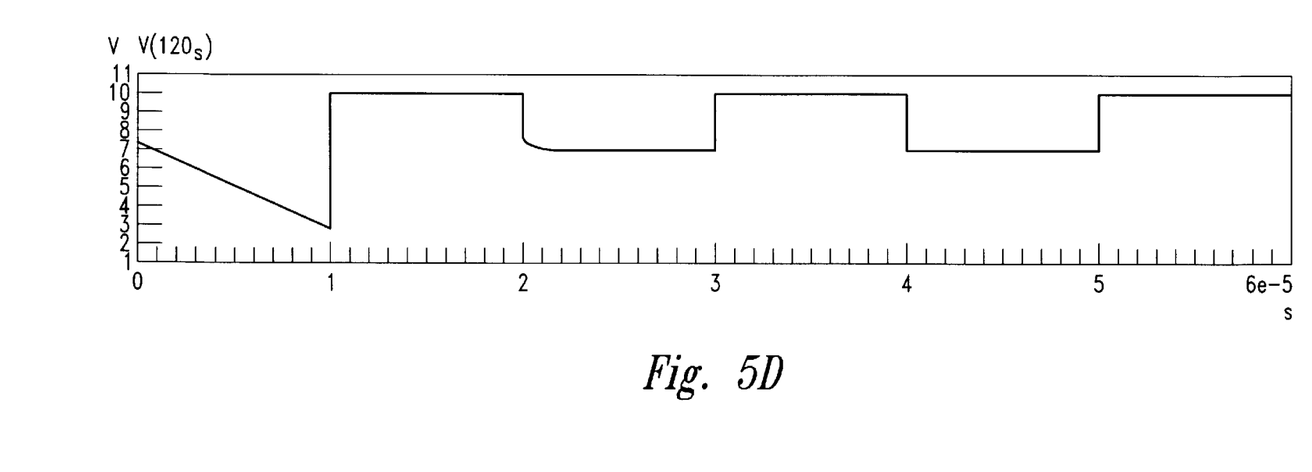
Figure 5E:
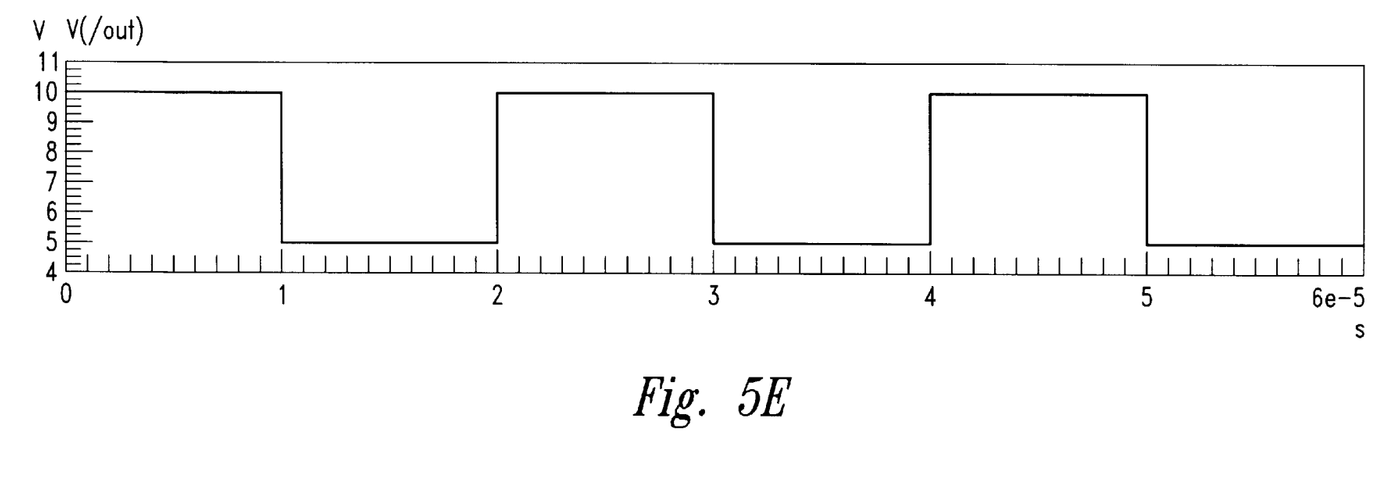

A set of graphs of voltages in the level shifter 64 during an actual simulation is shown in FIGS. 5A–5E. FIG. 5A shows the voltage at the input terminal 106 switching between 5 and 0 volts. When the voltage at the input terminal 106 is at 5 volts, and the first N-channel transistor 108 is switched ON to produce a voltage of 0 volts at the drain of the first transistor 108 as shown in FIG. 5B. Given that the gate of the third N-channel transistor 114 is coupled to the first voltage reference $V_{ref1}$, the drain of the third N-channel transistor also is at 0 volts. This causes the voltage on the source terminal of the first P-channel transistor 118 to be approximately 6 volts as shown in FIG. 5C and causes the voltage at the source terminal of the second P-channel transistor 120 to decay from approximately 7.5 volts to approximately 3 volts. In addition, the voltage at the output terminal 144 will be 10 volts as shown in FIG. 5E.

When the voltage at the input terminal 106 is at 0 volts, the first N-channel transistor 108 switches OFF which produces a voltage at the drain of the first N-channel transistor to be approximately 5 volts as shown in FIG. 5B. This causes the source terminal of the first P-channel transistor 118 and the source terminal of the second P-channel transistor 120 to each have a voltage of approximately 10 volts. As a result, the voltage at the output terminal 144 will be approximately 5 volts. Those skilled in the art can confirm that the level shifter 64 shifts the level of the voltages at the input terminal 106 from 0 and 5 volts to 5 and 10 volts, respectively, at the output terminal 144, although some of the details of the operation of the level shifter 64 are being omitted for simplicity.

It will be appreciated that the level shifter 64 shown in FIG. 4 is exemplary only. Various other known level shifters could be employed to shift the voltage values representing the digital logic values of the digital command signals received from the digital control unit 52. The DAC 66 includes a switch controller 150 that is coupled to the output terminal 144 of the level shifter 64. The DAC also includes a resistor ladder 152 that includes a chain of resistors 154 connected between positive and negative reference voltages as shown. A multiplexer 156 having switches 158 that couple an end of each of the resistors 154 to an output terminal 160 coupled to the input terminal 104 of the analog driver 68.

The switches 158 of the multiplexer 156 are controlled by the switch controller 150 based on the digital motor control signals received from the level shifter 64. The resistor ladder 152 and the multiplexer 156 together implement a voltage divider with the voltage produced on the output terminal 160 depending on which of the switches 158 of the multiplexer 156 is closed by the switch controller 150. The switch controller 150 essentially implements a decoder that is programmed to determine which of the switches 158 to close for each of the possible digital motor control signals that may be received from the level shifter 64. Because the level shifter 64 has level shifted the digital command signals from a digital control unit 52 to produce the digital motor control signals, the switch controller 150 is able to close any of the switches 128 to produces voltages on the output terminal 160 that are centered on $V_m/2$. For example, if $V_m/2$ equals 6 V and the level shifter produces digital motor control signals of 5 V and 10 V, then the switch controller can control the switches 128 to produces voltages on the output terminal 160 that are centered on the 6 V of $V_m/2$. Accordingly, the digital control unit 52 is able to control, by means of the level shifter 64, digital circuitry with threshold voltage levels ($V_{ref1}$ and $V_{ref2}$) that are not included in the normal 0–5 volt logic swings.

To create the voltage reference $V_{ref}$ at the top of the resistor ladder 152, the DAC 66 includes an amplifier 162, a resistor 164, and a current source 166. The resistor 164 is connected in feedback between an output and an inverting input of the amplifier 162. The current source 166 is connected between ground and the inverting input of the amplifier 162. A non-inverting input of the amplifier 162 receives a voltage ($V_m/2$) that is equal to one half of the motor supply voltage $V_m$.

As discussed above, it is desirable to have the average voltage at each end of the motor coil 70 to be approximately equal to $V_m/2$. As such, the DAC 66 may be designed to ensure that the average voltage on the output terminal 160 also is approximately $V_m/2$. That is accomplished by employing a second amplifier 168 having an inverted input coupled to a midpoint 170 of the resistor ladder 152, a non-inverting input coupled to $V_m/2$ and an output that is coupled to the bottom of the resistor ladder 152. As a result, the average voltage at the output terminal 160 is approximately equal to $V_m/2$ without requiring the analog driver 68 to include an analog level shifter.

It will be appreciated that the embodiment of the invention shown in FIGS. 2–4 is exemplary only. Each of the elements shown may be changed without departing from the invention. For example, the DAC 66 shown in FIG. 4 includes a resistor ladder 122, which could be replaced by a multiplicity of current sources or an arrangement of capacitors. Moreover, numerous other known analog motor drivers could be employed by removing the analog level shifters of the known motor drivers.

It should be understood that even though numerous features and advantages of the present invention have been set forth in the foregoing description, the above disclosure is illustrative only. Changes may be made in detail and yet remain within the broad principles of the present invention.

I claim:

1. A motor control circuit, comprising:

an analog driver structured to supply a motor coil with a supply voltage in response to receiving an analog driver input signal;

a digital to analog converter coupled to the analog driver, the digital to analog converter being structured to convert a digital motor control signal to the analog driver input signal; and a level shifter coupled to the digital to analog converter, the level shifter being structured to receive a low voltage digital command signal from a digital motor controller, increase the voltage of the digital command signal to produce the digital motor control signal, and provide the digital motor control signal to the digital to analog converter, the level shifter comprising:

(a) an inverter that receives the digital command signal and produces an inverted digital command signal;

(b) a first transistor having first, second, and control terminals, the first terminal being coupled to a first reference voltage and the control terminal being coupled to receive the digital command signal;

(c) a second transistor having first, second, and control terminals, the first terminal being coupled to the first reference voltage and the control terminal being coupled to receive the inverted digital command signal from the inverter;

(d) a third transistor having first, second, and control terminals, the first terminal being coupled to a second reference voltage, the second terminal being coupled to an output terminal, and the control terminal responsive to a voltage level at the second terminal of the second transistor, such that the third transistor produces at the output terminal the digital motor control signal at a level corresponding to the second reference voltage; and (e) a fourth transistor having first, second, and control terminals, the first terminal being coupled to a third reference voltage, the second terminal being coupled to the output terminal, and the control terminal being responsive to a voltage level at the second terminal of the first transistor, such that the fourth transistor produces at the output terminal the digital motor control signal at a level corresponding to the third reference voltage.

2. The motor control circuit of claim 1 wherein the digital to analog converter includes:

a resistor ladder having a string of series connected resistors coupled by corresponding switches to an output node at which the analog driver input signal is produced; and control logic that selectively closes one of the switches depending upon the digital command signal, the closed switch establishing a voltage level of the analog driving signal at the output node depending on where in the resistor ladder the closed switch is directly connected.

3. The motor control circuit of claim 2 wherein the digital to analog converter further includes a differential amplifier having an inverting input, a non-inverting input, and an output, the inverting input being coupled to a midpoint of the resistive ladder, the non-inverting input being coupled to a reference voltage that is approximately one-half of the supply voltage.

4. The motor control circuit of claim 1 wherein the digital to analog converter includes means for ensuring that the analog driver input signal has a voltage level midpoint that is approximately one-half of the supply voltage.

5. The motor control circuit of claim 1 wherein the analog driver is structured to drive current through the motor coil in a first direction in response to the analog driver input signal being greater than one-half of the supply voltage and the analog driver is structured to drive current through the motor coil in a second direction in response to the analog driver input signal being less than one-half of the supply voltage.

6. The motor control circuit of claim 1 wherein the analog driver includes a power switch with first, second, and control terminals, the first terminal being coupled to the supply voltage and the second terminal being coupled to the motor coil, the power switch being structured to drive the motor coil with the supply voltage in response to receiving at the control terminal an analog driver signal having a voltage level that is approximately equal to the voltage level of the analog driver input signal.

7. The motor control circuit of claim 1 wherein the analog driver includes a bridge circuit having first and second high-side transistors and first and second low-side transistors, the first high-side transistor being coupled between the supply voltage and a first end of the motor coil, the second high-side transistor being coupled between the supply voltage and a second end of the motor coil, the first low-side driving transistor being coupled between the first side of the motor coil and a ground potential, and the second low-side driving transistor being coupled between the second side of the motor coil and the ground potential; wherein the first high-side transistor and the second low-side transistor form a conductive path from the supply voltage to the ground potential through the motor coil in response to the analog input signal being greater than one-half of the supply voltage and the second high-side transistor and the first low-side transistor form a conductive path from the supply voltage to the ground potential through the motor coil in response to the analog input signal being less than one-half of the supply voltage.

8. A motor control circuit, comprising:

an analog driver structured to connect a first end of a motor coil to a supply voltage in response to receiving an analog driver input signal that is greater than approximately one-half of the supply voltage and is structured to connect a second end of the motor coil to the supply voltage in response to receiving an analog driver input signal that is less than approximately one-half of the supply voltage; and a digital to analog converter coupled to the analog driver, the digital to analog converter being structured to convert a digital motor control signal to the analog driver input signal, the digital to analog converter including a biasing circuit that establishes a midpoint of the digital to analog converter to be approximately one-half of the supply voltage.

9. The motor control circuit of claim 8, further comprising:

a level shifter coupled to the digital to analog converter, the level shifter being structured to receive a low voltage digital command signal from a digital motor controller, translate the voltage of the digital command signal to produce the digital motor control signal, and provide the digital motor control signal to the digital to analog converter.

10. The motor control circuit of claim 9 wherein the level shifter includes:

an inverter that receives the digital command signal and produces an inverted digital command signal;

a first transistor having first, second, and control terminals, the first terminal being coupled to a first reference voltage and the control terminal being coupled to receive the digital command signal;

a second transistor having first, second, and control terminals, the first terminal being coupled to the first reference voltage and the control terminal being coupled to receive the inverted digital command signal from the inverter;

a third transistor having first, second, and control terminals, the first terminal being coupled to a second reference voltage, the second terminal being coupled to an output terminal, and the control terminal being responsive to a voltage level at the second terminal of the second transistor, such that the third transistor produces at the output terminal the digital motor control signal at a level corresponding to the second reference voltage; and a fourth transistor having first, second, and control terminals, the first terminal being coupled to a third reference voltage, the second terminal being coupled to the output terminal, and the control terminal being responsive to a voltage level at the second terminal of the first transistor, such that the fourth transistor produces at the output terminal the digital motor control signal at a level corresponding to the third reference voltage.

11. The motor control circuit of claim 8 wherein the digital to analog converter includes:
  a resistor ladder having a string of series connected resistors coupled by corresponding switches to an output node at which the analog driver input signal is produced; and
  control logic that selectively closes one of the switches depending upon the voltage level of the digital motor control signal, the closed switch establishing a voltage level of the analog driving signal at the output node depending on where in the resistor ladder the closed switch is directly connected.

12. The motor control circuit of claim 11 wherein the digital to analog converter further includes a differential amplifier having an inverting input, a non-inverting input, and an output, the inverting input being coupled to a midpoint of the resistive ladder, the non-inverting input being coupled to a reference voltage that is approximately one-half of the supply voltage.

13. The motor control circuit of claim 8 wherein the analog driver is structured to drive current through the motor coil in a first direction in response to the analog driver input signal being greater than one-half of the supply voltage and the analog driver is structured to drive current through the motor coil in a second direction in response to the analog driver input signal being less than one-half of the supply voltage.

14. The motor control circuit of claim 8 wherein the analog driver includes a power switch with first, second, and control terminals, the first terminal being coupled to the supply voltage and the second terminal being coupled to the motor coil, the power switch being structured to drive the motor coil with the supply voltage in response to receiving at the control terminal an analog driver signal having a voltage level that is approximately equal to the voltage level of the analog driver input signal.

15. The motor control circuit of claim 8 wherein the analog driver includes a bridge circuit having first and second high-side transistors and first and second low-side transistors, the first high-side transistor being coupled between the supply voltage and a first end of the motor coil, the second high-side transistor being coupled between the supply voltage and a second end of the motor coil, the first low-side driving transistor being coupled between the first side of the motor coil and a ground potential, and the second low-side driving transistor being coupled between the second side of the motor coil and the ground potential; wherein the first high-side transistor and the second low-side transistor form a conductive path from the supply voltage to the ground potential through the motor coil in response to the analog input signal being greater than one-half of the supply voltage and the second high-side transistor and the first low-side transistor form a conductive path from the supply voltage to the ground potential through the motor coil in response to the analog input signal being less than one-half of the supply voltage.

16. A motor control circuit, comprising:
  an analog driver structured to supply a motor coil with a supply voltage in response to receiving an analog driver input signal;
  a digital to analog converter coupled to the analog driver, the digital to analog converter being structured to convert a digital motor control signal to the analog driver input signal, the digital to analog converter including, a resistor ladder having a string of series connected resistors coupled by corresponding switches to an output node at which the analog driver input signal is produced, and control logic that selectively closes one of the switches depending upon the digital command signal, the closed switch establishing a voltage level of the analog driving signal at the output node depending on where in the resistor ladder the closed switch is directly connected; and
  a level shifter coupled to the digital to analog converter, the level shifter being structured to receive a low voltage digital command signal from a digital motor controller, increase the voltage of the digital command signal to produce the digital motor control signal, and provide the digital motor control signal to the digital to analog converter; the level shifter comprising:
  (a) an inverter that receives the digital command signal and produces an inverted digital command signal;
  (b) a first transistor having first, second, and control terminals, the first terminal being coupled to a first reference voltage and the control terminal being coupled to receive the digital command signal;
  (c) a second transistor having first, second, and control terminals, the first terminal being coupled to the first reference voltage and the control terminal being coupled to receive the inverted digital command signal from the inverter;
  (d) a third transistor having first, second, and control terminals, the first terminal being coupled to a second reference voltage, the second terminal being coupled to an output terminal, and the control terminal responsive to a voltage level at the second terminal of the second transistor, such that the third transistor produces at the output terminal the digital motor control signal at a level corresponding to the second reference voltage; and
  (e) a fourth transistor having first, second, and control terminals, the first terminal being coupled to a third reference voltage, the second terminal being coupled to the output terminal, and the control terminal being responsive to a voltage level at the second terminal of the first transistor, such that the fourth transistor produces at the output terminal the digital motor control signal at a level corresponding to the third reference voltage.

17. A motor control circuit, comprising:
  an analog driver structured to supply a motor coil with a supply voltage in response to receiving an analog driver input signal;
  a digital to analog converter coupled to the analog driver, the digital to analog converter being structured to convert a digital motor control signal to the analog driver input signal, the digital to analog converter including means for ensuring that the analog driver input signal has a voltage level midpoint that is approximately one-half of the supply voltage; and
  a level shifter coupled to the digital to analog converter, the level shifter being structured to receive a low voltage digital command signal from a digital motor controller, increase the voltage of the digital command signal to produce the digital motor control signal, and provide the digital motor control signal to the digital to analog converter; the level shifter comprising:
  (a) an inverter that receives the digital command signal and produces an inverted digital command signal;
  (b) a first transistor having first, second, and control terminals, the first terminal being coupled to a first reference voltage and the control terminal being coupled to receive the digital command signal;
  (c) a second transistor having first, second, and control terminals, the first terminal being coupled to the first reference voltage and the control terminal being coupled to receive the inverted digital command signal from the inverter;

(d) a third transistor having first, second, and control terminals, the first terminal being coupled to a second reference voltage, the second terminal being coupled to an output terminal, and the control terminal responsive to a voltage level at the second terminal of the second transistor, such that the third transistor produces at the output terminal the digital motor control signal at a level corresponding to the second reference voltage; and (e) a fourth transistor having first, second, and control terminals, the first terminal being coupled to a third reference voltage, the second terminal being coupled to the output terminal, and the control terminal being responsive to a voltage level at the second terminal of the first transistor, such that the fourth transistor produces at the output terminal the digital motor control signal at a level corresponding to the third reference voltage.

18. A motor control circuit, comprising:

an analog driver structured to supply a motor coil with a supply voltage in response to receiving an analog driver input signal, the analog driver being structured to drive current through the motor coil in a first direction in response to the analog driver input signal being greater than one-half of the supply voltage and the analog driver is structured to drive current through the motor coil in a second direction in response to the analog driver input signal being less than one-half of the supply voltage;

a digital to analog converter coupled to the analog driver, the digital to analog converter being structured to convert a digital motor control signal to the analog driver input signal; and a level shifter coupled to the digital to analog converter, the level shifter being structured to receive a low voltage digital command signal from a digital motor controller, increase the voltage of the digital command signal to produce the digital motor control signal, and provide the digital motor control signal to the digital to analog converter; the level shifter comprising:

(a) an inverter that receives the digital command signal and produces an inverted digital command signal;

(b) a first transistor having first, second, and control terminals, the first terminal being coupled to a first reference voltage and the control terminal being coupled to receive the digital command signal;

(c) a second transistor having first, second, and control terminals, the first terminal being coupled to the first reference voltage and the control terminal being coupled to receive the inverted digital command signal from the inverter;

(d) a third transistor having first, second, and control terminals, the first terminal being coupled to a second reference voltage, the second terminal being coupled to an output terminal, and the control terminal responsive to a voltage level at the second terminal of the second transistor, such that the third transistor produces at the output terminal the digital motor control signal at a level corresponding to the second reference voltage; and (e) a fourth transistor having first, second, and control terminals, the first terminal being coupled to a third reference voltage, the second terminal being coupled to the output terminal, and the control terminal being responsive to a voltage level at the second terminal of the first transistor, such that the fourth transistor produces at the output terminal the digital motor control signal at a level corresponding to the third reference voltage.

19. A motor control circuit, comprising:

an analog driver structured to supply a motor coil with a supply voltage in response to receiving an analog driver input signal, the analog driver including a power switch with first, second, and control terminals, the first terminal being coupled to the supply voltage and the second terminal being coupled to the motor coil, the power switch being structured to drive the motor coil with the supply voltage in response to receiving at the control terminal an analog driver signal having a voltage level that is approximately equal to the voltage level of the analog driver input signal;

a digital to analog converter coupled to the analog driver, the digital to analog converter being structured to convert a digital motor control signal to the analog driver input signal; and a level shifter coupled to the digital to analog converter, the level shifter being structured to receive a low voltage digital command signal from a digital motor controller, increase the voltage of the digital command signal to produce the digital motor control signal, and provide the digital motor control signal to the digital to analog converter; the level shifter comprising:

(a) an inverter that receives the digital command signal and produces an inverted digital command signal;

(b) a first transistor having first, second, and control terminals, the first terminal being coupled to a first reference voltage and the control terminal being coupled to receive the digital command signal;

(c) a second transistor having first, second, and control terminals, the first terminal being coupled to the first reference voltage and the control terminal being coupled to receive the inverted digital command signal from the inverter;

(d) a third transistor having first, second, and control terminals, the first terminal being coupled to a second reference voltage, the second terminal being coupled to an output terminal, and the control terminal responsive to a voltage level at the second terminal of the second transistor, such that the third transistor produces at the output terminal the digital motor control signal at a level corresponding to the second reference voltage; and (e) a fourth transistor having first, second, and control terminals, the first terminal being coupled to a third reference voltage, the second terminal being coupled to the output terminal, and the control terminal being responsive to a voltage level at the second terminal of the first transistor, such that the fourth transistor produces at the output terminal the digital motor control signal at a level corresponding to the third reference voltage.

* * * * *